Oct. 30, 1956

H. LINDARS 2,768,823

WEIGHING MECHANISMS

Filed April 8, 1952

3 Sheets-Sheet 1

Inventor
Herman Lindars
By Peck & Peck
Attorneys

Oct. 30, 1956   H. LINDARS   2,768,823
WEIGHING MECHANISMS
Filed April 8, 1952   3 Sheets-Sheet 2

Oct. 30, 1956  H. LINDARS  2,768,823
WEIGHING MECHANISMS
Filed April 8, 1952  3 Sheets-Sheet 3

Inventor
Herman Lindars
By Peck & Peck
Attorneys.

United States Patent Office 2,768,823
Patented Oct. 30, 1956

2,768,823
WEIGHING MECHANISMS

Herman Lindars, Sheffield, England

Application April 8, 1952, Serial No. 281,168

Claims priority, application Great Britain April 11, 1951

2 Claims. (Cl. 265—56)

This invention concerns weighing mechanisms and has for an object to provide a mechanism which will enable weight to be ascertained, indicated or recorded, if desired at a remote point, and which can also be remotely set to weigh out a preselected quantity of a material, whether solid, fluid, powdered, granular, or in other comminuted form.

Weighing mechanism according to the present invention comprises a weighbeam, a counterpoise adjustably supported on said weighbeam for providing the weight balancing moment, mechanism for adjusting the position of said counterpoise, a position indiactor located at a remote point and a repeater transmission system interconnecting the counterpoise-adjusting mechanism and the remote position indicator.

Preferably, the counterpoise adjusting mechanism is driven by a motor which itself constitutes or directly drives one element of the repeater transmission system.

Advantageously, the repeater transmission system is operative to control the position of the counterpoise in accordance with a predetermined setting of the indicator.

The counterpoise is conveniently a jockey weight slidable along the weighbeam. Preferably the jockey weight is carried on a subsidiary beam which bears at one point on the main weighbeam and whose fulcrum is movable lengthwise of the weighbeam. Alternatively the counterpoise may comprise a weighted lever fulcrummed on the weighbeam.

Figure 1:
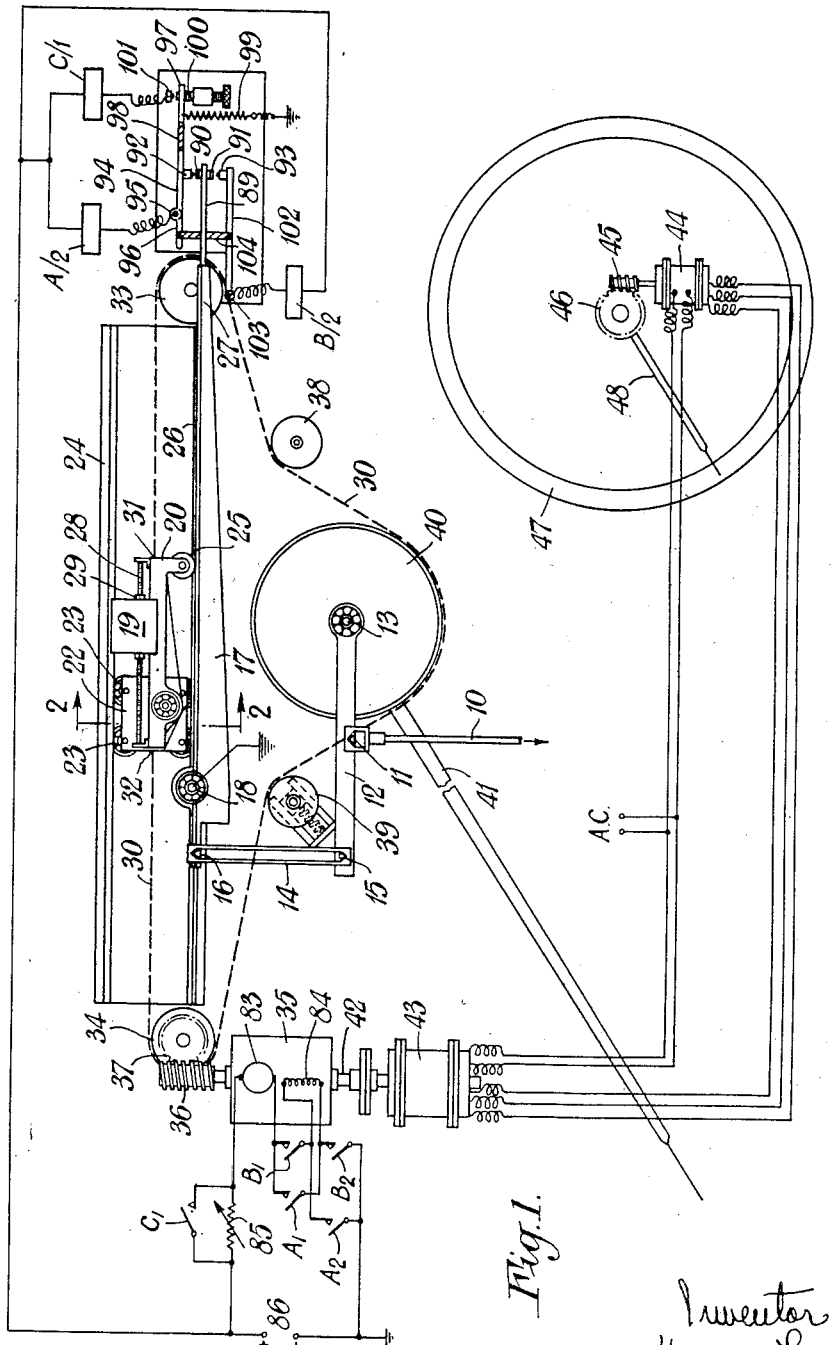
Figures 2, 5:
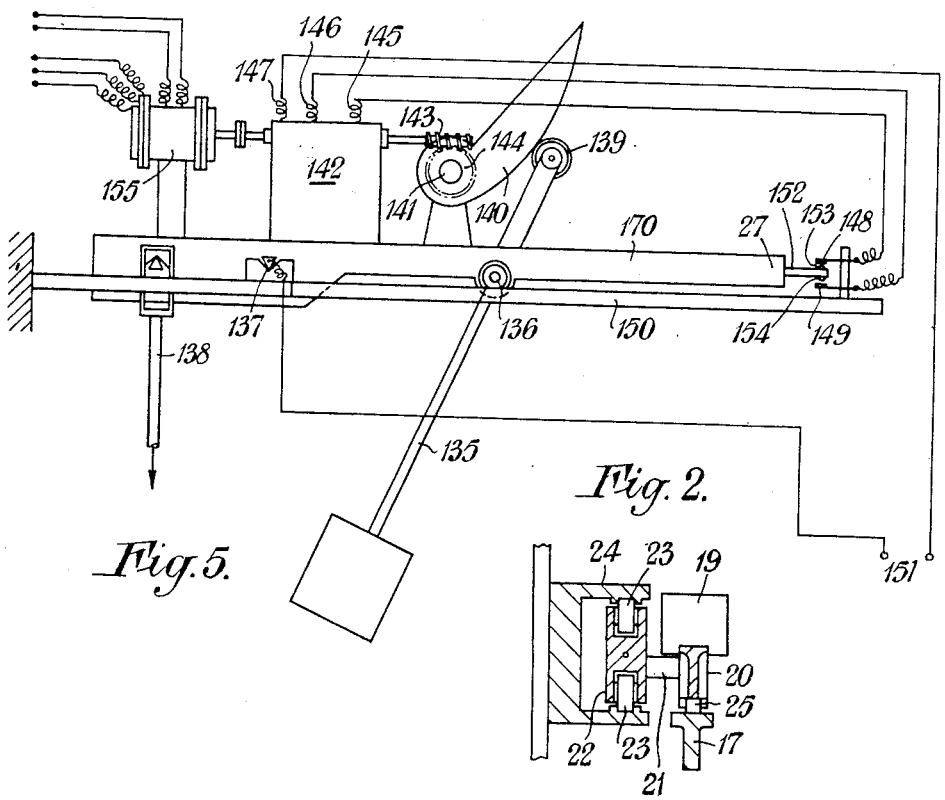
Figure 3:
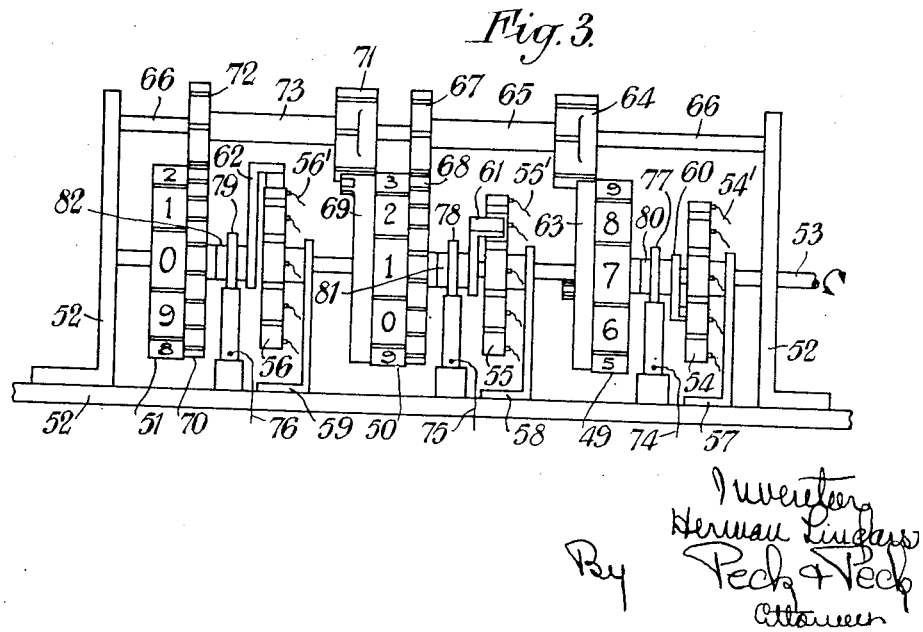
Figure 4:
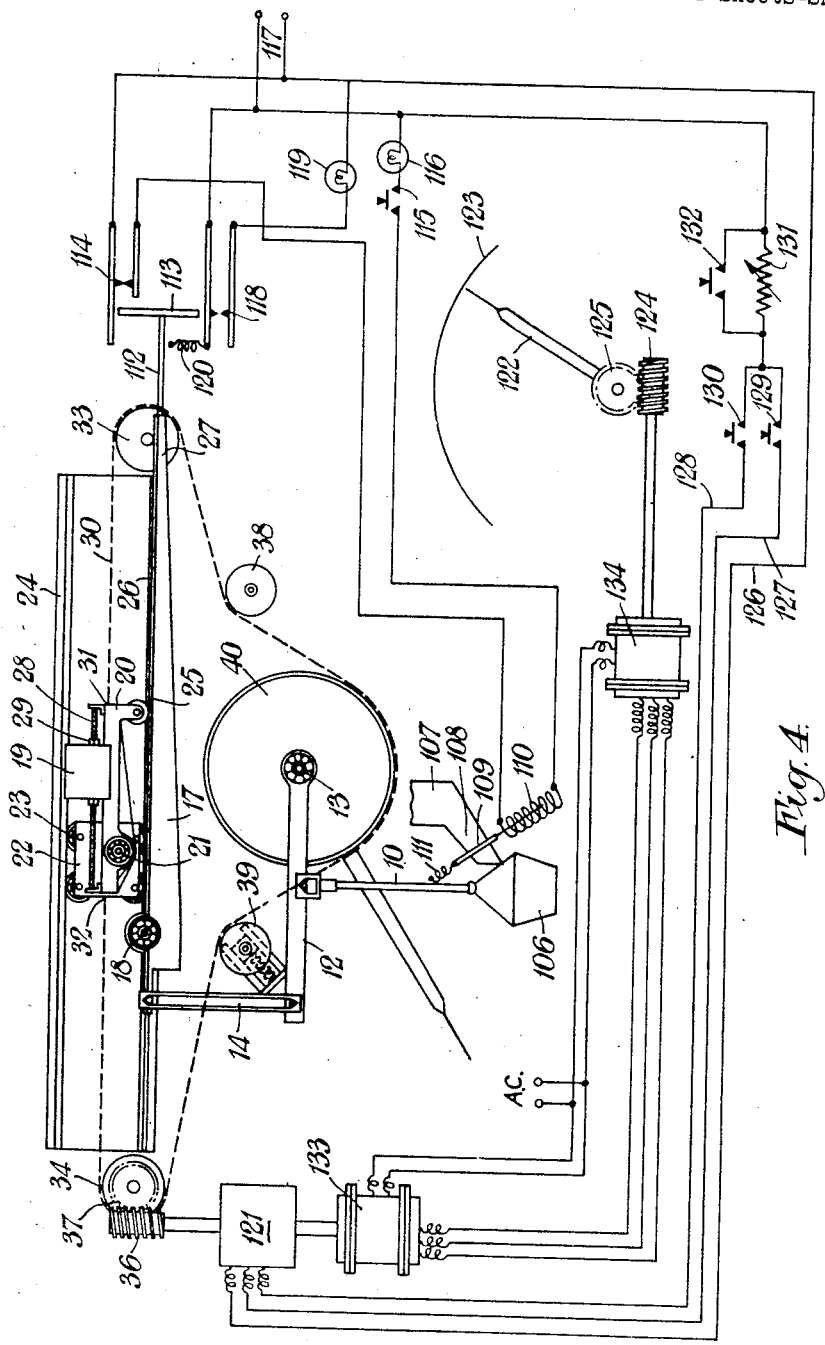

Various forms of the invention will now be described by way of illustration only and with reference to the accompanying drawings in which:

Figure 1 is a general arrangement view showing one form of weighing mechanism in accordance with the invention, Figure 2 is a section taken on the line 2—2 of Figure 1, Figure 3 shows an impulse generator for an alternative transmission system connecting the counterpoise adjustment mechanism and the counterpoise position indicator of Figure 1, Figure 4 is a general view of an alternative form of the weighing mechanism shown in Figure 1 which is arranged for remote setting, and Figure 5 is an alternative form of weighing mechanism in accordance with the invention.

Referring to Figures 1 and 2, the load is supported by a scale pan or platform (not shown), which is suspended by a link 10 and a knife edge 11 from an intermediate lever 12 carried on a ball bearing pivot 13 which is in turn linked through a lever 14 and further knife edges 15 and 16 to the main weighbeam 17. The general arrangement of the linkages and levers connecting a scale pan or weighing platform to the weighbeam 17 is well known per se. The weighbeam 17 is also mounted on a ball bearing fulcrum 18 carried on a frame part of the machine, and is balanced by means of a jockey weight 19 which is carried on a subsidiary beam 20 mounted on a ball bearing fulcrum 21 on a jockey carriage 22 which runs on wheels 23 in a fixed guideway 24 located above and to one side of the main weighbeam 17. The guideway 24 extends substantially parallel to the direction of the weighbeam 17 in its balance position for a length such that a roller 25 carried on the underside of the subsidiary beam 20 can bear on the upper side or edge 26 of the weighbeam 17 at any point between its fulcrum 18 and its free extremity 27—i. e. between positions of zero and maximum movement of the jockey weight 19. The jockey weight 19 is adjustable lengthwise of the jockey carriage 22, the jockey weight 19 being movable along a screwed rod 28 on which it is held in position by nuts 29.

Traverse of the jockey carriage 22 along the guideway 24 is effected by means of a flexible but substantially inextensible member in the form of an endless chain or cord 30, which is anchored to the jockey carriage 22 at 31 and 32 and which passes over sprockets or guide wheels 33 and 34 at the ends of the guideway 24. The sprocket wheel 34 is driven by a reversible electric motor 35 mounted on a frame part (not shown) of the mechanism, through a worm drive comprising a worm 36 which meshes with a gear 37. The chain or cord 30 also passes over an idler roller 38 and a spring-loaded tension roller 39 spaced equidistantly on opposite sides of an index wheel 40 having an operative circumferential length slightly greater than the full travel of the jockey carriage 22 along the guideway 24. This index wheel 40 is journalled coaxially with the pivot 13 of the intermediate lever 12 from which the weighbridge or scale pan (not shown) is suspended, and has secured thereto a pointer 41 (or a dial), for indicating the weight in the scale pan.

The motor 35 which drives the endless chain 30 also directly drives through a shaft 42 the transmitter 43 of an electrical repeater or synchro transmission system of the kind known by the trade name "Selsyn." This transmitter 43 is electrically coupled, in known manner, to a slave motor 44 located at the remote point and which is mechanically coupled through, for example a worm 45 and gear wheel 46, to a weight indicator comprising a scale 47 over which moves a pointer 48. Alternatively the slave motor 44 may be connected to a recorder.

In an alterative transmission system for connecting the counterpoise-adjustment mechanism and the counterpoise-position indicator, the driving shaft 42 of the motor 35 (or the shaft 13 of the index wheel 40), is connected to an impulse transmitter for sending impulses through an electrical channel to a receiver, each impulse representing a fixed increment or decrement of weight.

One such impulse transmitter is shown in Figure 3. It comprises three drums 49, 50 and 51 mounted on a common axis within a frame 52. The surface of each of the drums 49, 50 and 51 is divided into ten equal parts which are numbered "0" to "9" consecutively, the drums 49, 50 and 51 representing units, tens and hundreds respectively on a decimal scale of weight. The drum 49 is fixed to a shaft 53 journalled in the frame 52, the shaft 53 being driven through suitable reduction gearing (not shown), by the motor 35 or by the shaft 13 of the index wheel 40. Drums 50 and 51 are also carried on shaft 53 but are able to rotate freely on it. Associated with the drums 49, 50 and 51 are fixed ten-segment commutators 54, 55 and 56 respectively which are attached to lugs 57, 58 and 59 fixed to the frame 52 which also serve to support the shaft 53. These commutators 54, 55 and 56 have associated rotatable contact arms 60, 61 and 62 which are connected to and rotate with the drums 49, 50 and 51 respectively on the common axis of the drums and commutators, the "units" contact arm 60 being directly driven by the shaft 53. The drum 49 is connected through gearing to the next adjacent- or tens-drum 50 in such a manner that the drum 50 moves round through one segment pitch (36°) while the "units" drum 49 completes one revolution. Drums 50 and 51 are also interconnected by gearing to provide a similar relationship between them.

The gearing connecting drums 49 and 50 comprises a single-tooth gear wheel 63 fixed to drum 49, an intermeshing pinion 64 fixed to a stub shaft 65 which is rotatably mounted on a fixed support rod 66 running longitudinally of the frame 52, and a further pinion 67 mounted on the shaft 65 which meshes with a gear wheel 68 fixed to the drum 50. Similarly the gearing connecting drums 50 and 51 comprises a single tooth gear wheel 69 fixed to the drum 50, a gear wheel 70 fixed to the drum 51 and pinions 71 and 72 respectively which are mounted on a stub shaft 73 itself rotatably mounted on the support rod 66.

The contact arms 60, 61 and 62 are energised through leads 74, 75 and 76 connected to brushes 77, 78 and 79 which bear on slip rings 80, 81 and 82 electrically connected to the contact arms 60, 61 and 62 respectively. Selected segments of the commutators 54, 55 and 56 are thus energised with respect to a common lead (not shown) according to the positions of the drums 49, 50 and 51 and hence of the contact arms 60, 61 and 62 which rotate therewith.

The segments of the commutators 54, 55 and 56 are connected through leads e. g. 54', 55' and 56', to respective impulse relays or uniselectors (not shown) of conventional type for advancing a counter of the conventional drum or cyclometer type (also not shown) for indicating at the remote point the weight in the scale pan. If desired, the contact arms 60, 61 and 62 may also be connected to the respective drums of a similar cyclometer type counter located adjacent the weighing mechanism which may replace the pointer 41 (or dial) driven by the index wheel 40.

It will be understood that there may be more than three drums (for example there may be a "thousand" drum), and that the drums may be calibrated otherwise than in a decimal scale. For example, the inter-drum gearing may be arranged to record tons, hundredweights, quarters and pounds, or any other convenient units according to requirements, the number of segments in each commutator at the transmitter being correspondingly modified.

Any other form of remote repeater or synchronous servo transmission system connecting the counterpoise-adjustment mechanism and the counterpoise position indicator may be adopted as desired, but in general it is preferred to employ a system which is reversible so that weight may either be remotely indicated or recorded, or, as in the case of the mechanism shown in Figure 4 and described later, the counterpoise jockey carriage 22 may be preset from the remote indicator so that a given weight of material can be accurately weighed out.

The motor 35 for effecting the adjustment of the jockey carriage 22 is a D. C. series motor having an armature 83, a field coil 84 and an adjustable series resistance 85 in circuit with the field coil 84. This series resistance 85 is preset to determine the normal slow running speed of the motor 35, and has a pair of normally open relay contacts C₁ connected in parallel therewith. The connections of the field winding 84 are reversible by pairs of relay contacts A₁ and A₂ and B₁ and B₂ to be described below. The D. C. supply source is indicated by 86.

The weighbeam 17 carries at its outer end 27 a rigid extension 89 to whose extremity are secured, one on top and one beneath, electrical contact tips 90 and 91. These contact tips 90 and 91 are electrically bonded to the weighbeam fulcrum 18, which is earthed and they co-operate with upper and lower limit stop contacts 92 and 93 respectively. The upper limit stop contact 92 is mounted on a pivoted lever 94 having its pivot 95 located on the inward or weighbeam side of the contact 92. This lever 94 is provided with a short rearward tail 96, to be referred to later, and is extended forwardly beyond the limit stop contact 92 to carry a further contact stud 97 insulated therefrom by means of an insulated portion 98 of the lever 94. The forward extension of the lever 94 has also connected thereto a tension-biasing spring 99 which tends to hold the lever 94 down against a stop 100. On the opposite side of the lever 94 from this stop 100 is mounted a further fixed contact 101 for engagement by the lever contact stud 97 when the lever 94 is deflected upwards against the bias of the tension spring 99.

The lower limit stop contact 93 is also carried by a lever 102 pivoted on the inward or weighbeam side thereof at a point 103 somewhat behind, and below, the pivot 95 of the upper lever 94. The lower lever 102 is connected, at a point between its pivot 103 and the lower limit contact 93, to the tail 96 of the upper lever 94 by an inextensible link 104, the arrangement being such that approximately the same pressure as that required to be exerted upwards on the upper limit stop contact 92 to cause deflection of the lever 94 will, if exerted downwards on the lower limit stop contact 93, cause the same deflection of the upper lever 94 against its tension spring 99. These pressures are preselected to be less than the maximum thrust which the beam 17 exerts under the action of its rated maximum load, and are preferably within, say, 10% of the maximum load. Any unbalance of the beam 17 during a weighing operation, therefore, which exceeds 10% of the maximum rated load will cause the additional contacts to close.

Each of the upper and lower contacts 92 and 93 is connected in series with a respective relay A/2 or B/2 having the aforesaid contacts A₁ and A₂ and B₁ and B₂ respectively, which control the forward and reverse connections respectively of the motor 35. The additional stud contact 101 is also connected in series with a speed change relay C/1 whose contacts C₁ serve to short circuit the adjustable resistance 85 in series with the D. C. motor 35.

In operation, assuming the jockey weight 19 to be in the position of zero moment and the scale pan receives a load to be weighed which is in excess of 10% of the full scale load, the free end 27 of the weighbeam 17 is lifted against the upper limit stop contact 92 and deflects it, against the bias of the tension spring 99 acting on the upper contact lever 94, to cause the additional contacts 97 and 101 to engage. Both the forward and the change speed relays (A/2 and C/1 respectively) are thereby energised to close their respective contacts, A₁ and A₂ and C₁, in the motor circuit. The latter thus begins to run at full speed, driving the jockey carriage 22 forward under the control of the endless chain or cord 30.

As the roller 25 on the subsidiary beam 20 moves away from the weighbeam fulcrum 18, the residual moment of the load on the weighbeam 17 falls below the value of the moment exerted by the tension spring 99, and the latter pulls the upper stop contact lever 94 down against its stop 100, and in so doing breaks the circuit of the change speed relay C/1 through the additional stud contacts 97 and 101. The short-circuit is thus removed from the adjustable resistance 85 in the motor circuit, and the motor speed is reduced to its preset lower value. The jockey carriage 22 thus moves forward at a slower rate until it reaches the balance position. The free end 27 of the beam 17 begins to fall, and opens the circuit at the upper stop contact 92. The forward relay A/2 is thus de-energised and opens its contacts A₁ and A₂ to break the motor circuit and arrest movement of the jockey carriage 22 along the beam 17.

If the beam 17 overshoots its balance position and closes the circuit through the lower stop contact 93, the reverse relay B/2 is energised to change-over the motor connections, and the motor runs backwards at slow speed to retract the jockey carriage 22 until balance is established, the weighbeam 17 breaking the reverse relay circuit through contacts B₁ and B₂ at the lower stop contact 93 and causing the motor 35 to stop.

As the jockey carriage 22 moves under the control of the endless chain or cord 30, the latter causes the index wheel 40 to rotate and move its pointer 41 over the scale (not shown), so that the weight in the scale pan is indicated locally.

The arrangement shown in Figure 4 is a modification of the weighing mechanism shown in Figure 1 wherein the synchro transmission system is used in reverse to allow pre-setting of the counterpoise adjusting mechanism from the remote point at which the position indicator is located. The mechanism comprises a weighbeam 17 and associated jockey carriage 22 and jockey weight 19 as in the mechanism shown in Figure 1. In addition it includes a scale pan 106 attached to the link 10 and a hopper 107 for the material to be weighed out having an outlet 108 which is closed by a shutter 109. This shutter 109 is actuated by an electromagnet 110 which functions to open the shutter against the action of a spring 111.

Attached to the outer end 27 of the weighbeam 17 is an extension 112 carrying a short vertical member 113. Located adjacent the upper side of the weighbeam extension 112 are normally closed contacts 114 which form part of a circuit comprising the electro-magnet 110, a push button switch 115, an indicator lamp 116, and a source of D. C. current 117. On the underside of the weighbeam extension 112 are located normally open contacts 118 which form part of a circuit comprising an indicator lamp 119 and the D. C. supply source 117, the contacts 118 being held in the open position by a tension spring 120. The indicator lamps 116 and 119 and the push button switch 115 are located with the position indicator described below at a point remote from the weighing mechanism. The arrangement of the contacts 114 and 118 is such that a slight upward movement of the weighbeam 17 from the balance position, due to the moment of the load in the scale pan 106 exceeding slightly that exerted by the jockey weight 19, will open the contacts 114, whilst downward movement of the weighbeam 17 indicating that there is insufficient load in the scale pan 106 to balance the jockey weight 19 will close the contacts 118 against the action of the tension spring 120.

The driving motor for the jockey weight adjustment mechanism comprises a reversible motor 121 having three input leads 126, 127 and 128, of which lead 126 is connected directly to one pole of the D. C. source 117. The leads 127 and 128, which control the "forward" and "reverse" movements respectively of the motor 121, are connected through corresponding push button switches 129 and 130 and a common variable resistance 131 to the other pole of the supply source 117. A further push button switch 132 is provided in parallel with the variable resistance 131 so that this resistance 131 can be cut out of the motor circuit at will to increase the running speed of the motor. The motor 121 drives the chain-operating pulley 34 through the worm gear 36 and the gear wheel 37, the pulley 34 driving the chain 30 in the same manner as in the mechanism shown in Figure 1. The motor 121 also drives a transmitter 133 of a synchro transmitting system of the "Selsyn" type. This transmitter 133 is connected in known manner to a slave motor 134 forming part of a position indicator located at the remote point and comprising a pointer 122 movable over a scale 123 through a worm gear 124 and a gear wheel 125.

The mechanism shown in Figure 4 operates as follows:

The motor 121 is operated to bring the pointer 122 to the desired position on the scale 123 through the synchro system 133—134. The motor 121 is actuated by depression of one or other of the switches 129 and 130, either switch 129 or switch 130 being depressed according to the initial position of the pointer 122 on the scale 123 with respect to the desired final position. During the initial movement of the pointer 122 the switch 132 may be depressed to short-circuit the resistance 131 to speed up the motor 121 thereby causing the pointer 122 to move more quickly over the scale 123. As the pointer 122 approaches the desired point on the scale 123, the switch 132 is released thereby bringing into circuit the resistance 131 and slowing down the motor to enable a fine adjustment of the pointer 122 to be made. Simultaneously with movement of the pointer 122 the jockey carriage 22 is moved directly by the motor 121 to a position on the weighbeam 17 corresponding to the weight indication on the scale 123 located at the remote point and the outer end 27 of the weighbeam 17 is thereby tilted downwards about its fulcrum 18 to close contacts 118 and complete the circuit through the indicator lamp 119 and the supply source 117. Illumination of the lamp 119 indicates that the scale pan is ready for filling.

The jockey carriage 22 having been set at the required point on the weighbeam 17, the shutter 109 controlling the feed of material from the hopper 107 to the scale pan 106 is opened by depression of the push button switch 115 which completes the circuit from the supply source 117 through the contacts 114, completion of the circuit being indicated by illumination of the lamp 116. As material is fed from the hopper 107 to the scale pan 106 the load on the weighbeam 17 gradually increases and the outer end 27 of the weighbeam 17 moves upwards and allows contacts 118 to open under the action of the spring 120 and to break the circuit through the lamp 119 which is thereby extinguished showing that the scale pan 106 is being loaded. When the load on the weighbeam 17 equals the balancing moment by the jockey weight 19 the beam is horizontal so that a slight increase in the load in the scale pan 106 causes the end 27 of the weighbeam 17 to move upwards to open the contacts 114 and thereby to break the circuit through the electromagnet 110 so that the shutter 109 immediately closes under the action of the tension spring 111 and the feed of the material to the scale pan 106 is interrupted. At the same time the lamp 116 is extinguished thereby indicating to the operator that the required weight of material has been delivered to the scalepan 106. The operator can then release the push button switch 115. As soon as the scalepan 106 is emptied the weighbeam tilts under the action of the jockey weight to close contacts 114 and 118, the latter completing the circuit through lamp 119 to indicate to the operator that the scale pan 106 is ready for filling. The operation of filling the scale pan 106 can then be repeated by depression of switch 115, the position of the jockey carriage being first re-set by operation of the motor 121 if a different weight of material is to be weighed out.

An alternative arrangement of weighbeam according to the invention is shown in Figure 5. In this construction the counterpoise is constituted by a weighted lever 135 which is pivotally mounted at 136 on the weighbeam 170 on the opposite side of the fulcrum 137 thereof from the point of application 138 of the load. The lever 135 extends upwards for a short distance beyond its pivot 136 and terminates in a follower roller 139 which bears against the edge of a cam 140. This cam 140 is carried on a shaft 141 journalled in bearings (not shown), carried on the weighbeam 170 and the shaft 141 is rotated about a horizontal axis by a reversible electric motor 142 through a worm gear 143 and a gear wheel 144. Rotation of the cam 140 thus effects a variation in the angle of inclination of the weighted lever 135 with respect to the weighbeam 170 and thus affords means for varying the balancing moment applied to the weighbeam 170.

The reversing motor 142 is provided with three input connections 145, 146 and 147 of which 145 and 146 are for "forward" and "reverse" directions of rotation of the motor 142 respectively and 147 is common to both. The motor 142 is controlled through a pair of upper and lower limit stop contacts 148 and 149 respectively which are operated by the weighbeam 170, these contacts 148 and 149 are being open in the balance position thereof. The contacts 148 and 149 are conveniently carried on a frame part 150 of the mechanism and they are connected to the motor connections 145 and 146 respectively.

The common connection 147 of the motor 142 is connected directly to one pole of a source of D. C. current 151, the other pole being connected to the weighbeam 170. The other end 27 of the weighbeam 170 is provided with an electrically conducting extension 152 carrying contacts 153 and 154 on its upper and under surfaces respectively. These contacts 153 and 154 are arranged to engage the stop contacts 148 and 149 respectively.

The reversing motor 142 is also coupled to the transmitter 155 of a repeater or synchro transmission system whereby the position of the cam 140—and hence the magnitude of the balancing moment—can be indicated or recorded at a remote location, the transmitter 155 being connected to a slave motor 44 coupled to indicating mechanism 47, 48 as shown in Figure 1.

In operation, the weight to be ascertained is placed in a scale pan (not shown) attached to the lever 138 whereupon the weighbeam is tilted about its fulcrum 137, so that its outer end 27 either rises or falls according as to whether the initial balancing moment applied by the weighted lever 135, which is determined by the initial inclination of the lever 135 to the weighbeam 170, is less than or greater than that exerted by the load on the weighbeam. Assuming the balancing moment is less than that exerted by the load then the end 27 of the weighbeam 170 will rise and complete the "forward" circuit to the motor 142 through contacts 148 and 153 and motor connection 145 whereupon the motor 142 operates to drive the cam 140 in such a manner as to reduce the angle of inclination of the weighted lever 135 to the vertical and hence to increase the balancing moment exerted by it on the weighbeam. As soon as the beam is balanced the end 27 of the weighbeam 170 falls and breaks the motor circuit.

In the alternative arrangement shown in Figure 5, it will be understood that the weighbeam 170 may be of compound construction, the weighted lever 135, the reversible motor 142, and control cam 140 being carried, if preferred, on a subsidiary lever system which is coupled in suitable manner to the main weighbeam to which the load is applied. The shape of the cam 140 is preferably selected to ensure a linear relationship between the angular movement of the cam 140 and the change in balancing moment. If desired the transmission system may be of the kind whereby transmission can be effected from either end thereof, in order that a predetermined value of balancing moment may be preset on the weighbeam 170 from a remote point to enable the desired weight of material to be measured by the weighbeam 170.

What I claim is:

1. Weighing mechanism comprising a weighbeam; a fixed guideway located adjacent and parallel to said weighbeam; a counterpoise carriage adapted to run on said guideway; a lever pivoted at one end on said carriage and having a roller at its other adapted to run on said weighbeam between a point adjacent the fulcrum thereof to a point adjacent the free end thereof; a counterpoise adjustably secured on said pivoted lever; an endless flexible and inextensible counterpoise traversing member connected to said counterpoise carriage; a driving wheel at one end of said guideway over which said endless counterpoise traversing member passes in driving engagement; an idler wheel at the other end of the guideway over which the endless counterpoise traversing member passes; a drum journalled on a fixed axis adjacent the weighbeam fulcrum and having its circumference drivingly engaged by the endless counterpoise traversing member and of a length not greater than the maximum linear transverse of the counterpoise along the weighbeam; a local weight indicator driven by said drum; a reversible electric motor coupled to said driving wheel at one end of the guideway for traversing said counterpoise; a motor control circuit for governing the direction and speed of rotation of the motor; spaced upper and lower resiliently displaceable contacts adjacent the free end of the weighbeam; a rigid pivotal connection between said contacts for ensuring displacement thereof in unison; a common loading spring for yieldingly opposing displacement of said contacts; a contact carried by the weighbeam for alternative engagement with either of said upper and lower contacts in its respective normal limit position of deflection under unbalance conditions of the weighbeam; electrical connections from said upper and lower contacts and the weighbeam contact to respective forward and reverse direction portions of the motor control circuit; a movable motor speed control contact mechanically rigid with but electrically insulated from one of said upper and lower displaceable contacts; a fixed motor speed contact engageable by said movable contact only when either of said upper and lower contacts has been displaced by the weighbeam contact due to a predetermined excess of unbalance moment on the weighbeam; electrical connections from the said speed control contacts to the speed control portion of the motor control circuit; a remote weight indicator; an electrical signal generator driven by the counterpoise traversing motor; and adapted to generate signals indicative of the position of the counterpoise relative to the fulcrum of the weighbeam; a signal receiver electrically connected to said generator and adapted to respond to said signals; and a mechanical connection between said signal receiver and said remote weight indicator.

2. Weighing mechanism comprising a weighbeam; a counterpoise adjustably supported on said weighbeam; a drive for varying the effective position of the counterpoise relative to the weighbeam fulcrum; a counterpoise position indicator located remote from said weighbeam; a reversible electric motor coupled to said drive; a motor control circuit for an electrical contact carried by the free end of said weighbeam; a pair of normally fixed upper and lower limit stop contacts positioned for alternative engagement by the contact on the weighbeam when the latter moves to its normal upper or lower unbalance limit position and operative to control the direction of rotation of said motor; biasing means connected to both said fixed upper and lower limit stop contacts for yieldingly retaining them in their normal positions when either is engaged by the weighbeam contact with a pressure less by a predetermined amount than the maximum unbalance pressure which the weighbeam contact can exert thereon; a fixed motor speed control contact; a movable motor speed control contact mechanically connected to but electrically insulated from one of said limit stop contacts and normally separated from said fixed speed control contact, said speed control contacts being operative to control the speed selecting part of said motor control circuit; an alternating current signal generator directly driven from said motor; an alternating current signal receiver directly coupled to said remote position indicator; and an electrical circuit interconnecting said signal generator and said signal receiver, said generator being adapted to generate, and said signal receiver to respond to signals proportional to the instantaneous relative displacement of the counterpoise and the remote position indicator, each of said normally fixed upper and lower limit stop contacts being carried on a respective lever mounted on a horizontal pivot, the lever for one stop contact being extended beyond the said contact to carry the movable speed control contact and a connection to said biasing means, whilst the lever carrying the other fixed contact is coupled to the first mentioned lever by an inextensible link at points on the two levers such that deflection of either limit stop contact in the respective upward or downward direction produces substantially the same turning moment on the first lever to close the said speed control contacts.

References Cited in the file of this patent

UNITED STATES PATENTS

| | | | |
|---|---|---|---|
| 107,240 | Fairbanks | Sept. 13, | 1870 |
| 323,885 | Puffer | Aug. 4, | 1885 |
| 785,209 | Hamilton | Mar. 21, | 1905 |
| 1,254,668 | Foster | Jan. 29, | 1918 |
| 1,328,320 | Crane | Jan. 20, | 1920 |
| 1,347,207 | Buckingham | July 20, | 1920 |
| 1,484,358 | Norton | Feb. 19, | 1924 |
| 1,851,703 | Hamilton | Mar. 29, | 1932 |
| 1,765,495 | McKim | June 24, | 1935 |
| 2,068,565 | Okey | Jan. 19, | 1937 |
| 2,383,085 | Schmitz | Aug. 21, | 1945 |
| 2,392,023 | Cooper | Jan. 1, | 1946 |
| 2,422,167 | Hem | June 10, | 1947 |
| 2,506,470 | Roth | May 2, | 1950 |
| 2,518,568 | Pease | Aug. 15, | 1950 |
| 2,622,868 | Yeasting | Dec. 23, | 1952 |